Dec. 27, 1966    J. M. WININGER, JR., ETAL    3,293,844
PROCESS OF INCOMPLETELY LONGITUDINALLY SPLITTING
AN ORIENTED POLYMERIC FILM
Filed May 24, 1965

JOHN M. WININGER, JR.
RICHARD F. DYER
INVENTORS

BY *R. Frank Smith*

*Ronald J. Carlson*
ATTORNEY & AGENT

United States Patent Office 3,293,844
Patented Dec. 27, 1966

3,293,844
PROCESS OF INCOMPLETELY LONGITUDINALLY
SPLITTING AN ORIENTED POLYMERIC FILM
John M. Wininger, Jr., and Richard F. Dyer, Kingsport,
Tenn., assignors to Eastman Kodak Company, Rochester, N.Y., a corporation of New Jersey
Filed May 24, 1965, Ser. No. 458,357
6 Claims. (Cl. 57—157)

This application is a continuation-in-part of our application Ser. No. 257,386, filed Feb. 11, 1963, now abandoned.

This invention relates to longitudinal splitting of oriented polymeric films, sheets, strips, and the like, to form furcated networks of films. More paraticularly the invention relates to a novel method whereby furcated networks of film are formed by incomplete longitudinal splitting of an oriented polymeric film.

A unilaterally oriented polymeric film has been found to randomly split in a direction substantially parallel to the orientation. The splitting may take place to such an extent that individual fibers are formed which may be desirable as a substitute for spun filaments in various articles. On the other hand the splitting may take place only to an incomplete extent. In this manner the areas of the film between the splits remain attached to each other at their ends thereby forming a furcated network of film having substantially no free ends. Such a furcated network of film possesses the capability of splitting to a further extent. This capability renders the furcated network of film very desirable for articles such as twines and cords. With these articles the capability of additional splitting allows knots to be formed which have substantially no slip even through the polymeric surfaces are extremely slippery.

As a result it is readily apparent that a relatively simple and inexpensive method for producing in complete splitting of an oriented polymeric film would be desirable.

Therefore, it is an object of the present invention to provide a novel method whereby an oriented polymeric film may be incompletely split to form a furcated film network.

It is a further object of the present invention to provide a novel method for incompletely splitting an oriented polymeric film which is relatively simple and inexpensive to construct and operate.

Another object of this invention is to provide a novel method for continuously splitting an oriented polymeric film to an incomplete extent.

A further object of this invention is to provide a novel method for incompletely splitting an oriented polymeric film without inducing bulkiness.

An additional object of this invention is to provide a novel method for incompletely splitting an oriented polymeric film to form a furcated film network.

These and other objects of this invention will become apparent in the following discussion and by reference to the accompanying drawings.

In accordance with the present invention a polymeric film which has been highly oriented in the longitudinal direction is subjected to fluid forces on the surfaces thereof. These fluid forces cause the oriented film to split or furcate along random lines substantially parallel to the direction of orientation. Each split or rupture only extends for a short distance which varies at random with each split. The splitting is incomplete and the result is a furcated film network which possesses a capability of further splitting.

The invention may be more completely understood by reference to the drawings wherein.

Figure 1:
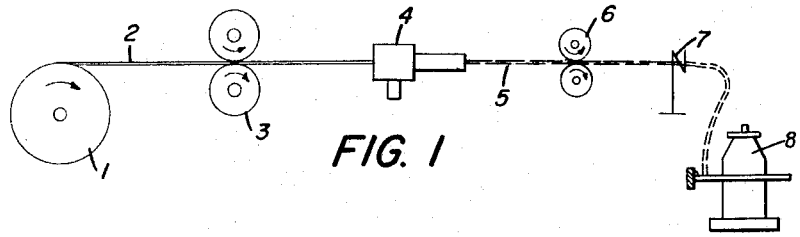
FIGURE 1 is a schematic side elevation view of a novel continuous method and apparatus of the present invention.

Referring first to FIGURE 1 there is a roll source 1 of highly oriented polymeric film 2. This film is oriented only in the longitudinal direction. Pull rolls 3 deliver the film from the supply roll to the longitudinal splitting device 4. The longitudinal splitting device applies fluid forces to the film as it passes therethrough causing it to randomly split or rupture along longitudinal lines. This device is discussed in more detail later in the specification.

The longitudinally split film 5 emerges under tension from the splitting device 4 with the aid of rolls 6 which are driven. It is at this point that the split film is a furcated film network. Thereafter the split film is led through guide 7, it is twisted and wound as a film product onto roll 8 for subsequent processing.

In connection with the above described method and apparatus it should be apparent that the oriented film may be supplied directly from a film forming and orienting process. Further along this line the split film 5 may be led directly from longitudinal splitting device 4 into any desired subsequent process for manufacturing the split film into a final article.

Figure 2:
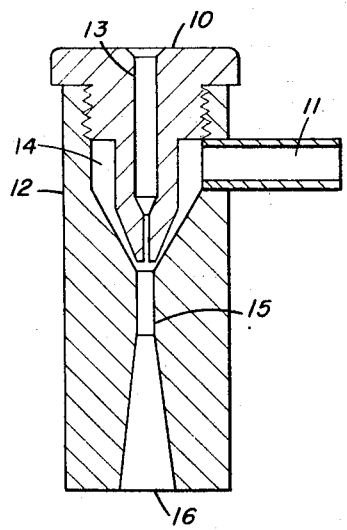
FIGURE 2 is a cross-sectional view showing one of the devices which may be employed for applying the fluid forces to the oriented film.
Figure 3:
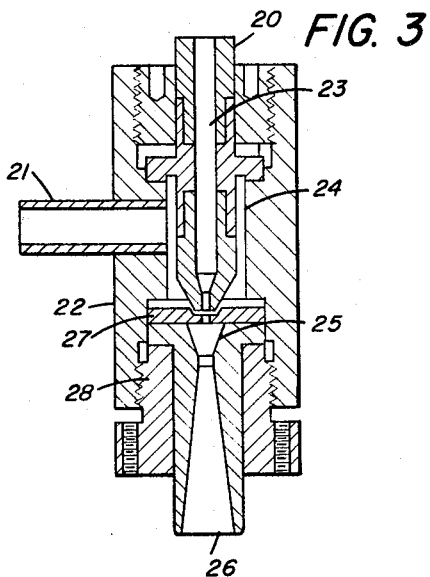
FIGURE 3 is a cross-sectional view showing another device which may be employed to apply the fluid forces to the oriented film.

In considering the longitudinal splitting device 4 reference should be had to FIGURES 2 and 3. However, before discussing the devices of FIGURES 2 and 3 in detail some basic points of the longitudinal splitting device should be mentioned.

Fluid force is applied to both sides of the film to induce splitting. The film is maintained under sufficient tension in the fluid force zone to prevent significant looping or contraction of the furcated film which is commonly termed bulking. In other words each portion of the film which has become split remains in a substantially longitudinal direction without being significantly bent outwardly or folded back on itself or on any other portion of the film. Furthermore, the splitting action takes place only to the extent of forming a furcated network of film, that is, there are substantially no free fiber ends.

In FIGURE 2 a longitudinal splitting device is depicted in cross-section so that the internal features may be seen. The device comprises an entrance section 10 having passage 13 through which the oriented polymeric film passes. Surrounding a portion of the entrance section 10 is a fluid chamber 14 formed by housing 12. Communicating with the fluid chamber 14 is a fluid inlet 11 fixedly secured in housing 12. Both the passage 13 and the fluid chamber 14 terminate in a common venturi-type passage 15 which also serves as an exit 16 from the longitudinal splitting device.

In the operation of the device, an oriented polymeric film enters through passage 13. Fluid under pressure is introduced to chamber 14 by way of inlet 11. Both the fluid under pressure and the film meet in the common passage 15 whereupon the forces of the fluid produce incomplete longitudinal splitting in the film. Thereafter the fluid and the split film exit from the device at 16.

It is again emphasized that in moving the film through the device shown in FIGURE 2 no looping or bulking of the split portions of the film occurs. The fluid flows through the device with a minimum of swirling. The exiting split film therefore contains no portions which are folded back on themselves or twisted but rather remain in substantial alingment with the initial longitudinal direction of travel. Furthermore, there are substantially no free ends since the splitting is incomplete. Thus the product may be described as a furcated film network.

FIGURE 3 illustrates a similar longitudinal splitting device to that shown in FIGURE 2.

There is an entrance section 20 provided with a passage 23. A fluid chamber 24 formed by housing 22 surrounds the lower portion of the entrance section. Fluid is supplied to chamber 24 by inlet 21. Both the chamber 24 and the passage 23 terminate in a common passage formed in adjusting plate 27. This common passage leads into a venturi-type passage 25 which terminates as an exit from the device at 26.

The adjusting plate 27 may be moved towards or away from the termination point of passage 23 and chamber 24 so that the fluid passing therethrough may be controlled. Adjustment is made by turning the threaded adjusting means 28.

The following examples will more fully illustrate the present invention.

*Example 1*

A polypropylene film which had been longitudinally oriented at a draft ratio of 12:1 was fed into a longitudinal splitting device as shown in FIGURE 2. A gaseous fluid was supplied to the device at 60 pounds per square inch gauge pressure. The speed at which the film was passed through the splitting device was 400 feet per minute.

The resulting longitudinally split film appeared as a furcated film network wherein each portion was substantially aligned in the longitudinal direction of the split film. Furthermore, there were substantially no free ends.

*Example 2*

An oriented polypropylene film prepared as in Example 1 was fed into a longitudinal splitting device as shown in FIGURE 3. A gaseous fluid was supplied to the device at 20–30 pounds per square inch gauge pressure.

The resulting longitudinally split film had the same characteristics as did the split film of Example 1.

*Example 3*

An oriented polypropylene film was processed according to Example 2 with the exception that steam at 70 pounds per square inch gauge was supplied to the device.

The resulting split film remained as a furcated network of split film having substantially no free ends. Also there was substantially no looping or bulking of the various separated portions of the film.

*Example 4*

A highly oriented polypropylene film was fed to a longitudinal splitting device of the type described previously in the specification. A mixture of air and sand at 80 pounds per square inch gauge was supplied to the device.

A non-bulked furcated film network having substantially no free ends was obtained from the exit end to the device.

A number of films were oriented and longitudinally split in accordance with the present invention. The results are indicated in the table below wherein the percent additional "split-ability" was determined by forming the resulting furcated network of split film into a twine, tying knots therein, and determining the additional longitudinal splitting which occurred as a result of the knot.

TABLE I

| Draft | No. of Longitudinal Splits After the Splitting Operation | No. of Longitudinal Splits After Knotting | Percent Additional "Splitability" |
|---|---|---|---|
| 11.5:1 | 87 | 108 | 24 |
| 10.5:1 | 82 | 120 | 46 |
| 10.5:1 | 100 | 125 | 25 |
| 10.5:1 | 88 | 116 | 32 |

From this table it can be seen that the furcated network is capable of being further split to a much greater degree.

Any polymeric film which is capable of being longitudinally split may be employed with the present invention. These films include those which are capable of being molecularly oriented to a high degree in a unilateral direction such as polyolefins. Examples of specific compositions are polypropylene, polyethylene, polyallomer, polybutene, polyvinyl chloride, polyvinylidene chloride, polyesters, polyurethanes, or blends thereof such as polypropylene and styrene, and many others.

The particular fluid used with the process and apparatus of the present invention, by way of example, may be air, an inert gas, or steam. The fluid may also contain particles such as sand, shot, or other granular material. A combination of air and water could also be used.

It is only necessary that the fluid be capable of exerting sufficient shock on the film so as to cause longitudinal splitting. Pressures may vary considerably depending on the particular fluid, the orientation of the film, and the desired degree of resulting splitting or furcation of the film.

In the drawings and specification there have been set forth preferred embodiments of the invention and, although specific terms have been employed, they are used in a generic and descriptive sense only and not for purposes of limitation, the scope of the invention being defined in the claims.

We claim:
1. A process for producing a furcated non-bulked film product that can be used as a tying material having superior knot holding properties which comprises the steps of:
   (a) providing a sheeting of polymeric composition of sufficient thickness to produce a non-bulked film product when the sheeting is subjected to a drafting orientation followed by a longitudinal fluid fracturing operation;
   (b) subjecting at least a portion of the polymeric sheeting to a drafting orientation whereby the longitudinal tensile strength thereof is increased while the lateral strength is diminished and the sheeting section is thereby rendered susceptible of fluid fracturing;
   (c) feeding the orientated polymeric sheeting to a longitudinal splitting zone;
   (d) subjecting both sides of the orientated polymeric sheeting to substantially equal high velocity forces within the longitudinal splitting zone to an extent that a major portion of the fracturability is consumed thereby producing a plurality of elongated interconnected flat ribbons;
   (e) withdrawing from the splitting zone the non-bulked furcated network of flat ribbons;
   (f) and further forming the network of flat ribbons into a film product which is characterized in that the product possesses additional and inherent fracturability within the range of from about 20 to 50 percent and has substantially no individual fibers or free ends so that upon the product being knotted at least a part of the additional fracturability is brought into operation thereby providing a more secure knot with less tendency to slip.

2. A process according to claim 1 wherein the fluid force is applied to both sides of the sheeting at substantially the same time to thereby form a furcated network of film having substantially no free ends.

3. A process according to claim 1 wherein the polymeric sheeting is passed through the longitudinal splitting zone under sufficient tension to prevent significant looping or contraction of the sheeting when it is furcated.

4. A process according to claim 1 wherein the fluid forces are produced by a mixture of gas and at least one solid granular material under pressure.

5. A process according to claim 1 wherein the fluid forces are produced by a mixture of gas and at least one liquid material under pressure.

6. A process according to claim 1 wherein the fluid forces are produced by air under pressure.

References Cited by the Examiner

UNITED STATES PATENTS 2,924,868   2/1960   Dyer _____ 28—1

FOREIGN PATENTS 624,991   8/1961   Canada.

ANDREW R. JUHASZ, *Primary Examiner.*